(12) United States Patent
Mandy

(10) Patent No.: US 10,733,698 B2
(45) Date of Patent: Aug. 4, 2020

(54) SYSTEM AND METHOD FOR RENDERING PERSPECTIVE ADJUSTED VIEWS OF A VIRTUAL OBJECT IN A REAL WORLD ENVIRONMENT

(71) Applicant: Groundspeak, Inc., Seattle, WA (US)

(72) Inventor: Dominic Mandy, Portland, OR (US)

(73) Assignee: Groundspeak, Inc., Seattle, WA (US)

( * ) Notice: Subject to any disclaimer, the term of this patent is extended or adjusted under 35 U.S.C. 154(b) by 0 days.

(21) Appl. No.: 16/376,248

(22) Filed: Apr. 5, 2019

(65) Prior Publication Data

US 2019/0311460 A1 Oct. 10, 2019

Related U.S. Application Data

(60) Provisional application No. 62/654,216, filed on Apr. 6, 2018.

(51) Int. Cl.

| | |
|---|---|
| *G06T 3/00* | (2006.01) |
| *H04W 56/00* | (2009.01) |
| *H04L 29/06* | (2006.01) |
| *G06K 19/06* | (2006.01) |
| *A63F 13/216* | (2014.01) |
| *H04W 4/02* | (2018.01) |
| *G06F 3/0481* | (2013.01) |
| *G06T 19/00* | (2011.01) |
| *G06T 7/70* | (2017.01) |
| *G06F 3/0346* | (2013.01) |
| *G02B 27/01* | (2006.01) |

(52) U.S. Cl.
CPC .......... *G06T 3/0068* (2013.01); *A63F 13/216* (2014.09); *G06F 3/04815* (2013.01); *G06K 19/06037* (2013.01); *G06T 7/70* (2017.01); *G06T 19/006* (2013.01); *H04L 67/38* (2013.01); *H04W 4/023* (2013.01); *H04W 56/002* (2013.01); *A63F 2300/8082* (2013.01); *G02B 2027/0198* (2013.01); *G06F 3/0346* (2013.01)

(58) Field of Classification Search
None
See application file for complete search history.

(56) References Cited

U.S. PATENT DOCUMENTS

| | | | |
|---|---|---|---|
| 10,372,397 B2 * | 8/2019 | Yu | G06F 3/0346 |
| 2013/0257907 A1 * | 10/2013 | Matsui | G09G 5/377 |
| | | | 345/633 |
| 2014/0002359 A1 * | 1/2014 | Weising | G06F 3/0304 |
| | | | 345/158 |

(Continued)

*Primary Examiner* — Jwalant Amin
(74) *Attorney, Agent, or Firm* — Krista A. Wittman

(57) ABSTRACT

A computer-implemented system and method for rendering perspective adjusted views of a virtual object in a real world environment is provided. A database of virtual objects is maintained. A registration code that changes based on at least one of time and a location of the device is generated. A representation of the registration code is received from another device that captures the representation of the registration code from the device. A distance and orientation of the other device from the device is determined based at least in part on the registration code representation. Positions of the device and the other device are synched based on the determined distance and orientation and views of a virtual object are adjusted for the device and other device based on the synched positions of the devices.

20 Claims, 6 Drawing Sheets

(56) References Cited

U.S. PATENT DOCUMENTS

| | | | | |
|---|---|---|---|---|
| 2014/0160250 A1* | 6/2014 | Pomerantz | ......... | H04N 5/23229 |
| | | | | 348/47 |
| 2016/0180884 A1* | 6/2016 | Nowak | ................ | H04N 9/8205 |
| | | | | 386/201 |
| 2017/0270362 A1* | 9/2017 | Barnehama | ............. | G06F 1/163 |
| 2018/0005393 A1* | 1/2018 | Senthamil | ............. | G06T 19/006 |
| 2019/0114802 A1* | 4/2019 | Lazarow | ................... | G06T 7/74 |

* cited by examiner

60

SYSTEM AND METHOD FOR RENDERING PERSPECTIVE ADJUSTED VIEWS OF A VIRTUAL OBJECT IN A REAL WORLD ENVIRONMENT

CROSS-REFERENCE TO RELATED APPLICATION

This non-provisional patent application claims priority under 35 U.S.C. § 119(e) to U.S. Provisional Patent application, Ser. No. 62/654,216, filed Apr. 6, 2018, the disclosure of which is incorporated by reference.

FIELD

The present invention relates in general to augmented reality and, specifically, to a system and method for rendering perspective adjusted views of a virtual object in a real world environment.

BACKGROUND

Augmented reality combines real world attributes, such as physical position or movement, with computer-generated, often graphical, data. Together, the attributes and data form a user experience occurring in a real world environment, while interacting with virtual objects, typically occurring in real time. In general, augmented realities are presented through graphical user interfaces, which can also be supplemented with auditory cues, tactile feedback, and other computer outputs. Thus, the user is able to view virtual objects positioned in the real world.

Recently, the capabilities of mobile platforms, such as portable media players, personal data assistants (PDA), and mobile telephones, have grown to enable on-the-go generation of augmented realities. Users are no longer tied to desktop environments and the physical constraints imposed by having to remain in a relatively stationary position. Moreover, these platforms are increasingly being equipped with input capabilities extending beyond the immediate user interface. For instance, mobile telephones often incorporate built-in cameras and global positioning system (GPS) receivers, the latter of which enables the device to determine the user's physical location. Similarly, portable media players are beginning to incorporate motion sensors that sense directional device orientation.

For the most part, the extended capabilities of these devices have been limited to providing abstract objects with a real world view for a single user, rather than collaboratively between multiple users. For instance, Pokemon Go by Niantic, Inc. of San Francisco, Calif., is a location based augmented reality game in which a user captures virtual Pokemon characters by moving around in the real world. A user can capture the characters by touching a virtual ball that appears on a screen of a mobile device and flinging the ball towards the virtual character positioned in the real world. However, catching the virtual characters are limited to a single user who is on a solo journey to catch and collect Pokemon characters.

In a recent update, raid battles were introduced in Pokemon Go, in which multiple players can join a raid to collaboratively attack a raid boss by independently fighting the raid boss at the same time. However, within the raid, a user is unable to interact with other users in the same battle or raid. For instance, the users are unable to communicate with one another and to coordinate moves to defeat the raid boss. Further, views of the users are not coordinated such that cooperative play can occur.

Therefore, a need remains for an approach to providing spatially accurate and oriented perspective views of virtual objects in the real world based on the location of each of a plurality of users.

SUMMARY

Currently, augmented reality games are limited to single user experiences or multi-user experiences in which multiple users focus on independent play to collaboratively complete an action. The multi-users are unable to interact with one another and with common virtual objects. For example, the augmented reality game, Pokemon Go, allows multiple users to individually battle a common virtual object, but fails to allow the users to communicate or to collaboratively manipulate virtual objects in a real world setting. Incorporating such features into an augmented reality experience can be challenging and must consider how to constantly determine orientation of two or more mobile devices, with respect to one another, in real time to provide complementary views of the same virtual objects to each user of the mobile devices. At this time, mobile devices and servers are not equipped to solve such problems. However, utilizing registration codes, which are like QR codes, but constantly changing due to a changing time and location of a mobile device, allows a computer processor to determine and track a location of one device with respect to another device. Registration can occur by synching the mobile devices when one mobile device scans a registration code from the other mobile device. Synching the mobile devices allows the users of those devices to move around in the real world and view the same virtual objects in the correct perspective as they would see an object in the real world based on the users' locations and positions with respect to one another.

One embodiment provides a computer-implemented system and method for rendering perspective adjusted views of a virtual object in a real world environment. A database of virtual objects is maintained. A registration code that changes based on at least one of time and a location of a mobile device is generated. A representation of the registration code is received from another device that captures the representation of the registration code from the device. A distance and orientation of the other device from the device is determined based at least in part on the registration code representation. Positions of the device and the other device are synched based on the determined distance and orientation and views of a virtual object are adjusted for the device and other device based on the synched positions of the devices.

Still other embodiments of the present invention will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
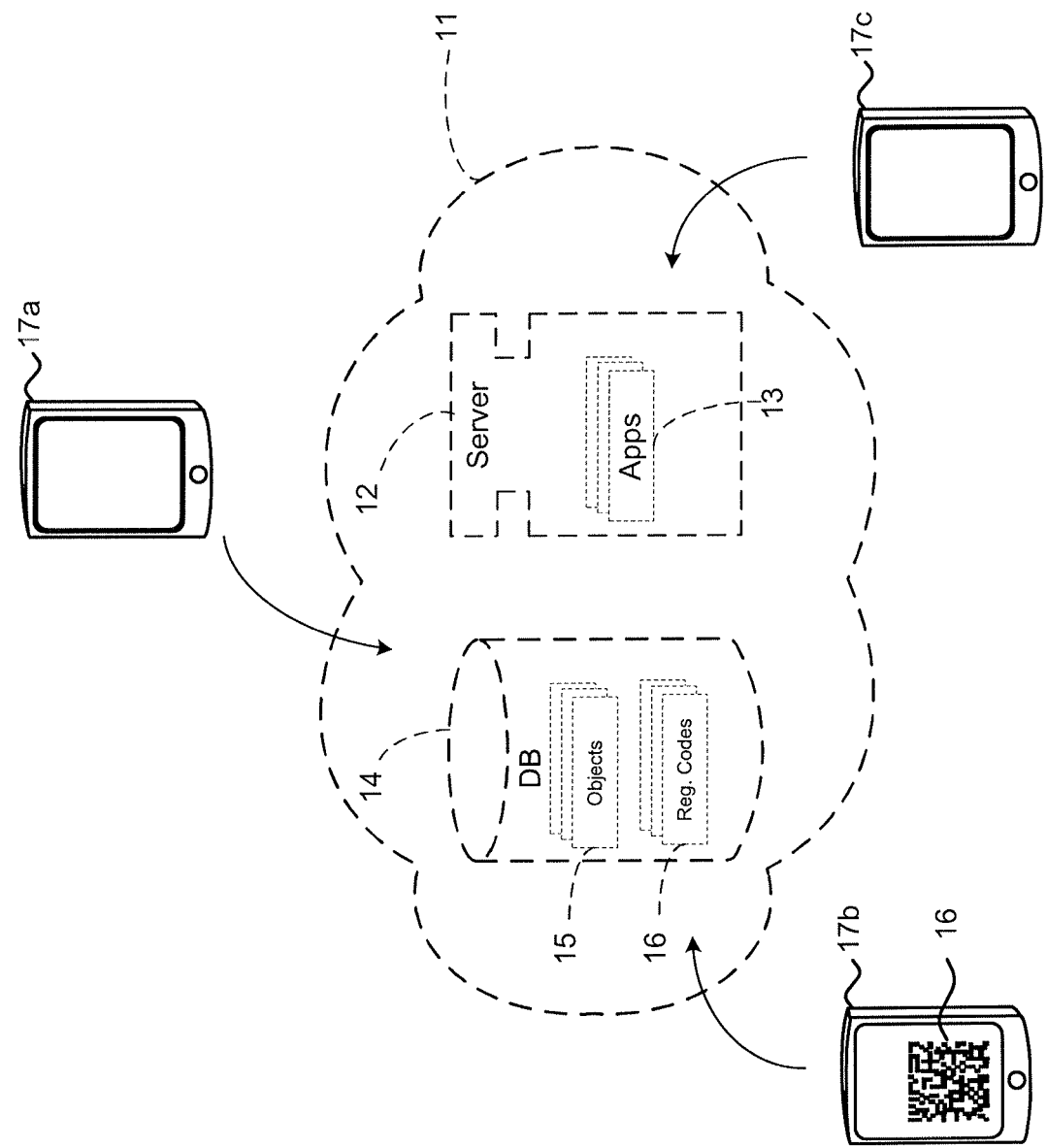
FIG. 1 is a functional block diagram showing a system for rendering perspective adjusted views of a virtual object in a real world environment, in accordance with one embodiment.

A dynamically changing registration code provides information to synchronize mobile devices and provide complementary views of virtual objects in a real world setting. FIG. 1 is a functional block diagram showing a system 10 for rendering perspective adjusted views of a virtual object in a real world environment, in accordance with one embodiment. The system 10 can operate via a cloud computing environment 11, which allows end users to access and utilize remotely-stored applications 13 without requiring the users to install software or personal data. Instead, clients receive cloud-based software 13 and stored data. Each of the users can operate a mobile computing device 17a-c, such as a mobile telephone, tablet, or smart watch to access the applications 13 and data 15, 16 stored on remote servers 12 and databases 14. Other types of mobile computing devices are possible. At a minimum, each mobile computing device should include a display screen, user interface, camera, and wireless communication capabilities, such as WiFi, cellular, LTE, and Bluetooth. Wired communications can also be used.

The mobile devices 17a-c each execute an application program ("app") 13, which can be implemented through software, firmware, or hardware for execution locally on the mobile device. The app 13 can be obtained from a server 12 located in the cloud 11. The app 13 generates a registration code 16 for the mobile device 17a-c on which the app is executed. The registration code 16 can include registration information, such as an identification of the mobile device, a location and orientation of the mobile device, and time. Other types of information are possible. In one example, the registration code 16 can appear similar to a matrix barcode, such as a QR code, and can be represented as multiple black squares arranged on a white background in a shape of a square. However, other shapes and types of the registration code are possible.

As the mobile device 17a-c moves and as time passes, the registration code 16 changes to reflect the movement and time passage. For instance, the black squares can move positions on the white background to reflect the information change and provide the new location and orientation of the device, and time. To synchronize with another mobile device 17a-c for perspective view cooperation with respect to virtual objects, the mobile device 17a-c can display the registration code 16 for scanning by the other mobile devices 17a-c. Subsequently, the app 13 determines a distance and orientation between the device 17a-c and the other mobile device 17a-c to perform synchronization of the mobile devices after a representation of the registration code 16 is captured on the other device. In a further embodiment, the synchronization and provision of the devices can occur via peer-to-peer computing of the mobile devices, rather than relying on a client-server relationship. Once synchronized, virtual objects 15 can be obtained from a database 14 interconnected to one or more servers 12 and displayed on the screens of the synchronized mobile devices 17a-c for perspective adjusted cooperation views.

The perspective adjusted cooperation views allow users of the mobile devices 17a-c to view the virtual objects 15 from a real world perspective in a real world environment. For example, a user of one mobile device views a front of a virtual car displayed on a screen of the device, which appears to be parked on the street adjacent to a sidewalk in the real world. Another user operating another mobile device is located to the right of the user, on the real world sidewalk, and views the driver side of the virtual car, as if the virtual car was real. The respective perspectives of the users are described in further detail below with respect to FIGS. 3-6.

Figure 2:
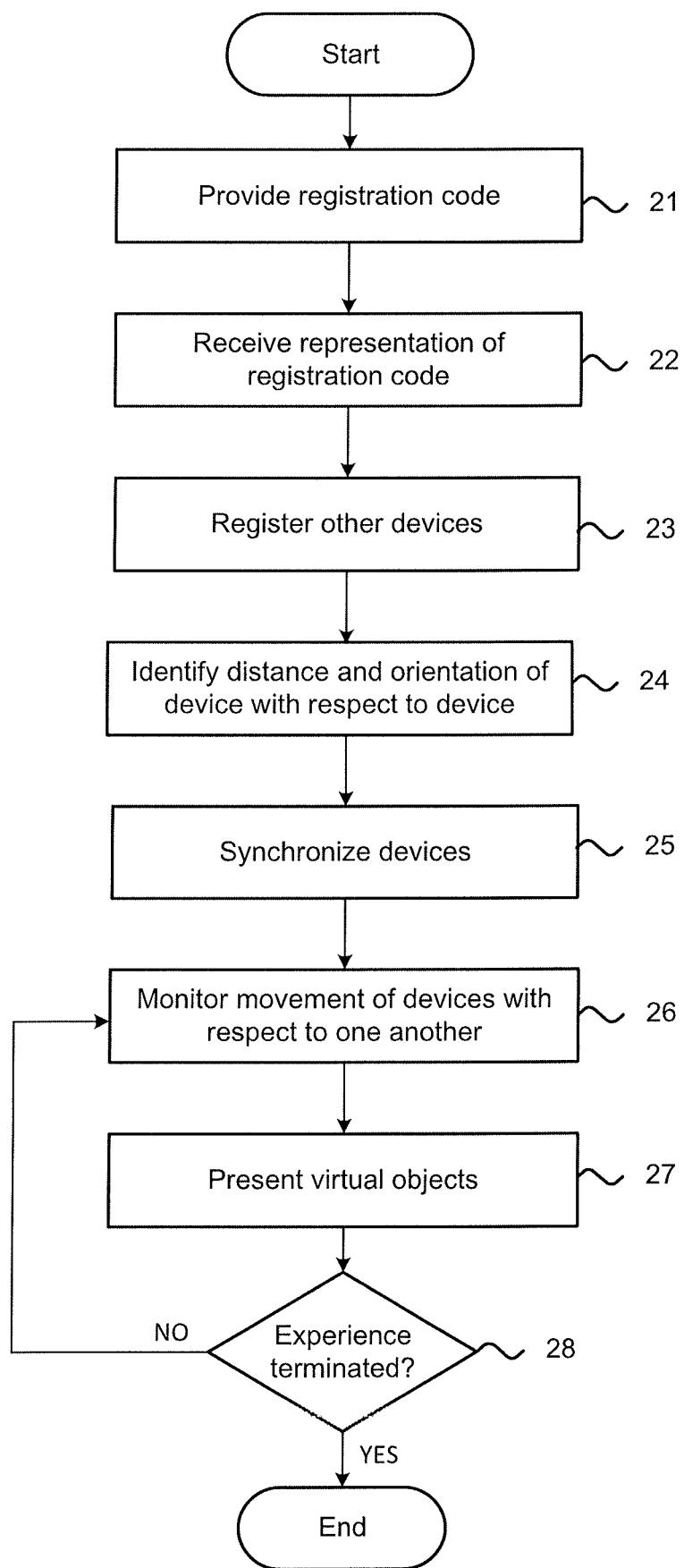
FIG. 2 is a process flow diagram showing a method for rendering perspective adjusted views of a virtual object in a real world environment, in accordance with one embodiment.
Figure 3:
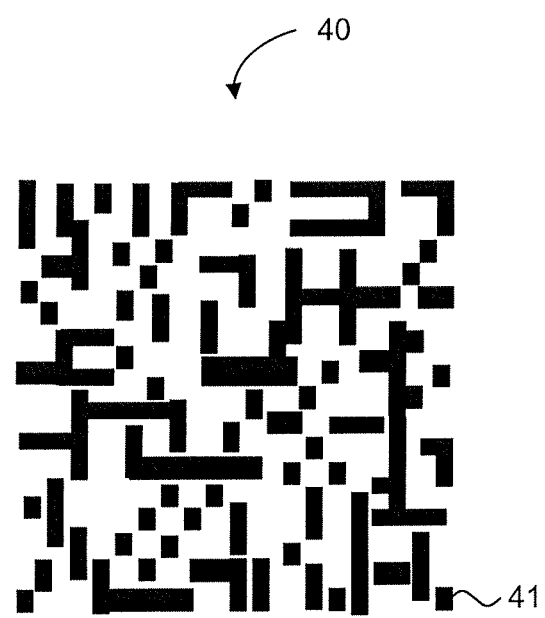
FIG. 3 is a block diagram showing, by way of example, a registration code 40.

To initiate perspective adjusted cooperation between at least two mobile devices, registration and synchronization must occur to orient the devices. FIG. 2 is a process flow diagram showing a method for rendering perspective adjusted views of a virtual object in a real world environment, in accordance with one embodiment. When an initiating user opens an app to initiate an augmented reality game or adventure, a registration code is generated and provided (block 21) to a mobile device of the user, as an initiating device. The registration code encodes information regarding the initiating device of the initiating user, such as adventure or game identification, device identification, location, including coordinate positions, orientation, and time. However, other types of information are possible. FIG. 3 is a block diagram showing, by way of example, a registration code 40. The registration code 40 can include a plurality of black and white shapes or modules 41, such as squares, which encode data and together form a larger shape, such as a square. However, other shapes are possible. The data can include augmented reality session identification, mobile device identification, user identification, location, orientation, and time. Other types of data are possible. The data can be encoded using alphabetic characters, text, numbers, and URLs. At least a portion of the registration code 40 can change to reflect changes in the data, such as user, session, or device location and time. Other parts of the registration code 40 can represent static information, such as experience identification, mobile device identification, and user identification, and the modules can remain in the same position. For example, an outer border of a registration code 40 can represent the static information and remain unchanged, while the modules inside the outer static border change constantly based on the changes in time, location, and orientation of the user. Alternatively, other arears of the registration code and represent static and dynamic modules.

Returning to the discussion with respect to FIG. 2, the registration code can be displayed on a screen of the user's initiating device to allow other users to join the initiating user in an augmented reality session. Alternatively, the registration code can be displayed on a larger display, such as a television, for capturing by mobile devices of multiple other users at a single time. The other users can capture the registration code by scanning the code with their respective mobile devices, as receiving devices. Upon scanning, a representation of the captured registration code is received (block 22) on the receiving device and registration of the mobile device is performed (block 23). In one embodiment, a server receives the registration code for processing; however, in a peer-to-peer environment, the captured registration code remains on the receiving device for processing. During registration, information from each receiving device that scanned the registration code is obtained and recorded for use throughout the augmented reality game or experience to determine (block 24) a distance and orientation of that receiving device with respect to the initiating user's mobile device. The information obtained from the receiving devices can include device identification, location, and orientation, and can be used with the data from the registration code of the initiating device to determine at least one of distance and orientation between each receiving device and the initiating device.

The orientation of the receiving device can be determined from information, such as pitch, roll, yaw and location coordinates, x, y and z, obtained from sensors, including orientation sensors and accelerometers, in the mobile device. In one embodiment, the information can be retrieved from a six-axis gyroscope located in the mobile device. However, other configurations and sensors can be used to obtain the information. Meanwhile, a distance of the receiving device from the initiating device can be determined via computer vision analysis based on a size and proportion of the registration code representation captured. For example, smaller representations of the registration code are associated with longer distances between the mobile devices, while larger representations are associated with shorter distances. Alternatively, or in addition, the distance can be determined based on the location or coordinate information obtained from the receiving device and the registration code from the initiating device.

The information obtained from the receiving device is used with the information provided by the registration code for the initiating device to synchronize (block 25) the devices. Specifically, synchronization utilizes the locations and orientations of the initiating and receiving devices to ensure that the positions of the synched devices are coordinated in space over time. Upon synchronization, the information provided by the receiving device and information for the initiating device can be stored in a file and utilized to track movement of the devices and determine orientation and distance from each other. Subsequently, during the augmented reality game or experience, movement of the synched devices are monitored (block 26) with respect to one another and each device continuously updates the server with its location and orientation. The initiating device, including position information, is used as a frame of reference for the other receiving mobile devices, which are updated relative to the initiating device.

Virtual objects are displayed (block 27) on a screen of at least one of the synched mobile devices, depending on a position and orientation of the users and mobile devices. The location and orientation information of each mobile device is translated into a correct visual representation relative to a player position for that device. Thus, each user's view of the virtual object depends on her location with respect to the virtual object, as further described below with reference to FIGS. 4-6. Based on a distance to the virtual object, the user can perform an action on or with respect to the virtual object depending on rules of the particular game or experience. Monitoring movement (block 26) of the synched devices and presenting virtual objects (block 27) occurs until the experience is terminated (block 28) by at least one of the users.

Figure 4:
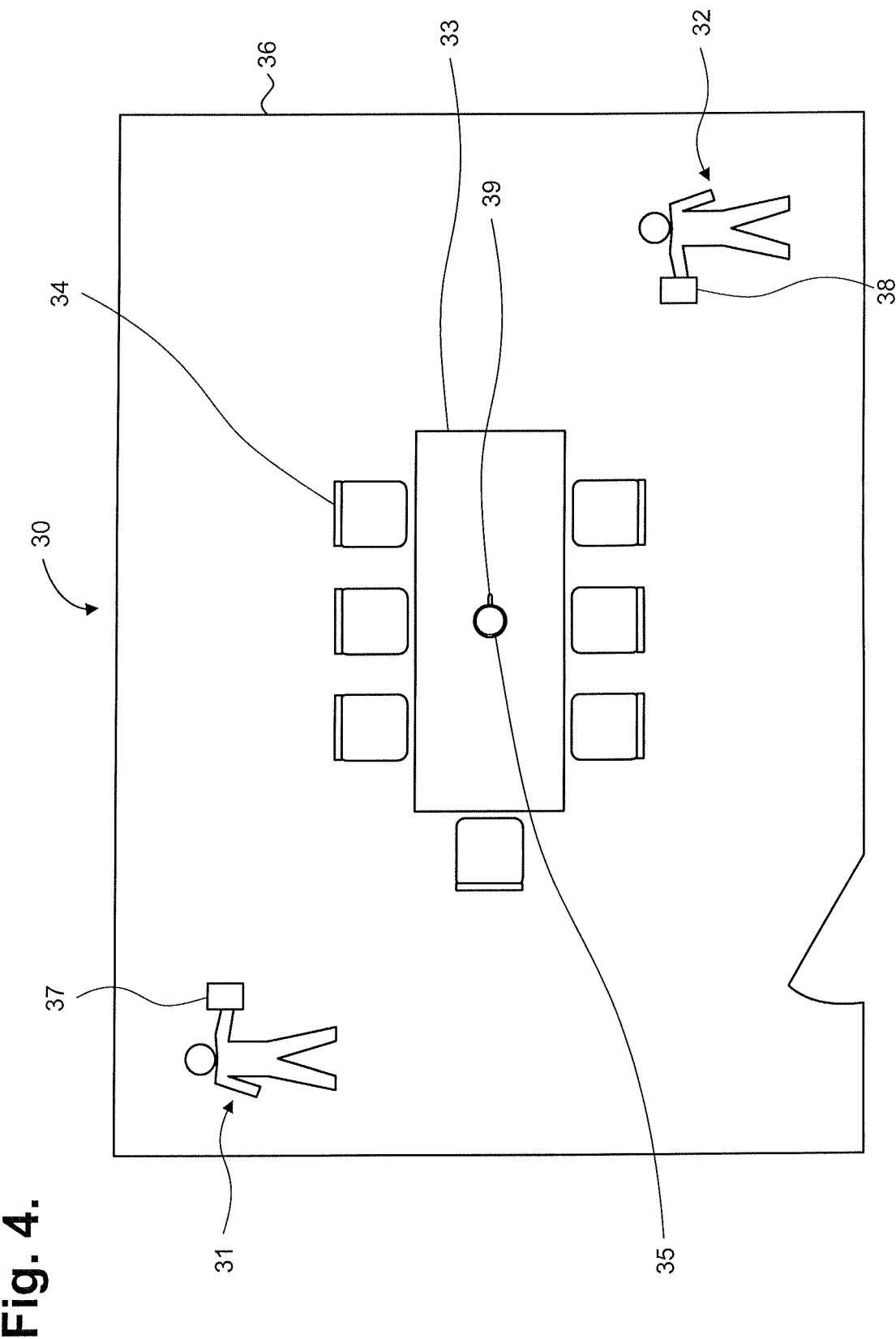
FIG. 4 is a block diagram showing, by way of example, a floor plan of a real world environment with a virtual object.

When the users of the synched devices are in a common viewing range, the users' perspectives of a virtual object are adjusted to ensure respective views of the virtual object based on the location and orientation of each user with respect to the virtual object. FIG. 4 is a block diagram showing, by way of example, a floor plan 30 of a real world environment 36 with a virtual object 35. The floor plan 30 is a representation of a real world conference room 36 in which a real conference table 33 and chairs 34 are positioned in a center of the room 36. Two users 31, 32 are located in the room 36, one in a bottom right corner 32 and the other in a top left corner 31, diagonally across from the user 32 in the bottom right corner. The users 31, 32 are oriented to face one another. Each user is holding a mobile computing device, such as a mobile phone 37, 38 on which an augmented reality app is running. The app accesses the camera on each mobile device 37, 38 to provide the corresponding user 31, 32 with a view of the conference room. A virtual object 35, in the shape of a tea cup, is displayed via the mobile devices 37, 38 of the users 31, 32, as being placed on the real world conference room table 33 with the handle 39 of the tea cup facing the user 32 in the bottom right hand corner of the conference room 36.

Figure 5:
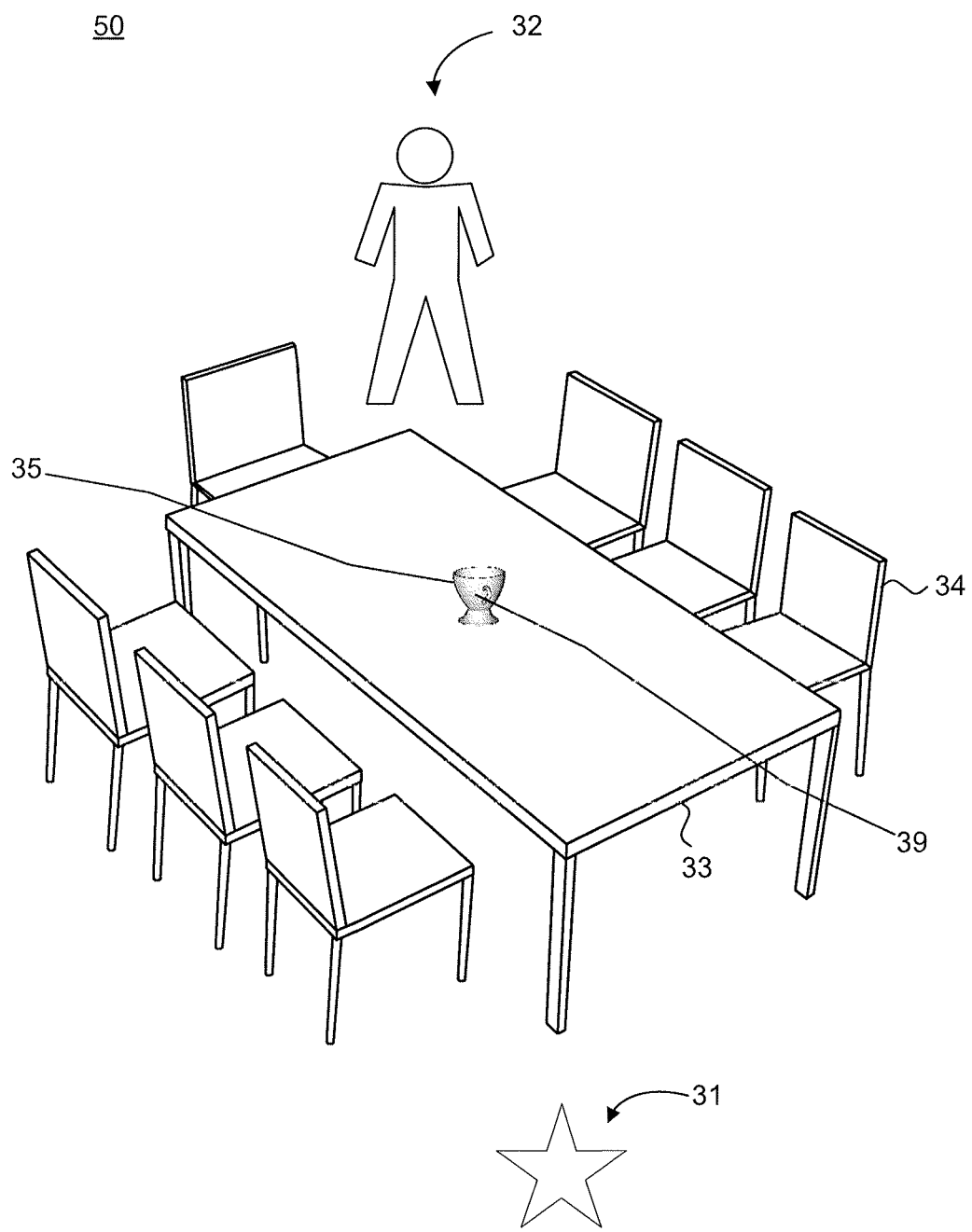
FIG. 5 is a block diagram showing, by way of example, a perspective view of a virtual object in the real world environment of FIG. 4 from one user perspective.

The mobile devices 37, 38 of the users 31, 32 are synched and each user 31, 32 receives a perspective corrected view of the virtual tea cup 35, which is representative of the view each user 31, 32 would have if the tea cup was real. FIG. 5 is a block diagram showing, by way of example, a perspective view 50 of a virtual object 35 in the real world environment of FIG. 4. The user's 31 position has been rotated to the bottom of the figure to provide a reader with the same view as the user. Thus, the user 31 views the real world conference table 33 with the other user 32 at the opposite end of the table 33, near the top of the figure. The user 31 views a chair 34 to a left of the other user 32, which is actually located on a right side of the other user 32. The virtual tea cup 35 sits in a center of the conference table 35 with the handle 39 facing the user 31. Thus, the user 31 is able to view the virtual handle 39 of the tea cup 35.

Figure 6:
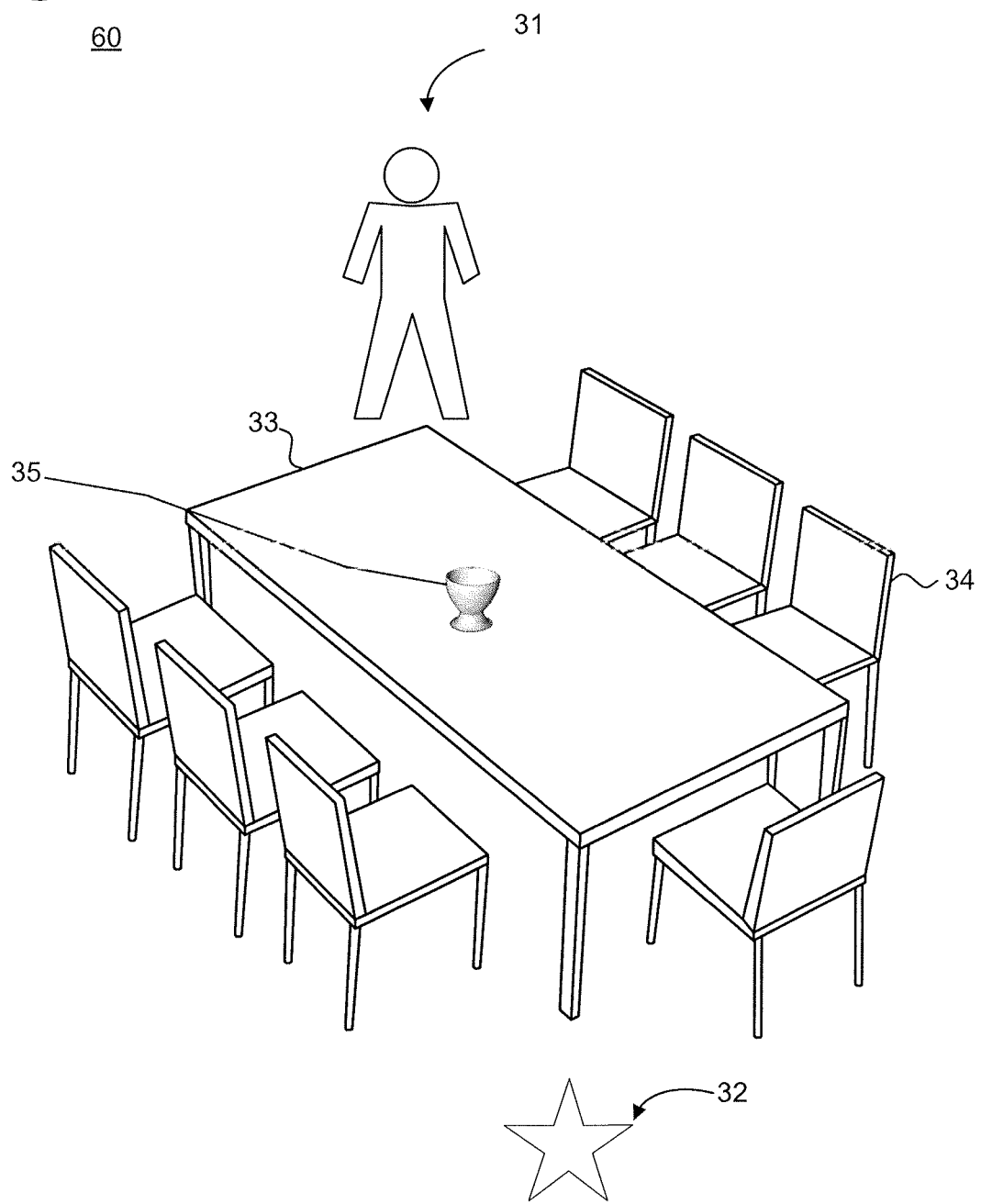
FIG. 6 is a block diagram showing, by way of example, a different perspective view of a virtual object in the real world environment of FIG. 4 from a different user perspective.

The other user 32 has a view opposite the user 31. FIG. 6 is a block diagram showing, by way of example, a different perspective view 60 of a virtual object 35 in the real world environment of FIG. 4. The user's 32 position has been rotated to the bottom of the figure to provide a reader with the same view as the user. The perspective view 60 of the user 32 includes the conference room table 33 with a real world chair 34 to a right of the user 32. With respect to the virtual object 35 on the real world conference table 33, the user 32 sees the opposite side of the tea cup 35 than the other user 31. Thus, since the handle (not shown) of the tea cup 35 faces the other user 31, the user 32 cannot see the handle.

Providing accurate perspective views of virtual objects in a real world environment can be used in augmented reality games, experiences, activities, and simulations. For example, an augmented reality game can include a list of virtual objects which each user participant must find and capture within a real world environment, within a predetermined time. A first player can receive the name of an object, such as a ladybug, which the second user must find and capture. Meanwhile, the second user receives the name of an object, such as a spider, which the first user must find and capture. The two players can collaboratively find the virtual objects within the real world environment. Depending on where the players are looking, the players can see the same or different virtual objects. For instance, the second player may see the spider hanging above the first player's head and tell the first player to look up. Once the first player looks up and sees the spider, the spider can be captured. The views of the spider can be different because of the players' different positions. For instance, the first player looks up and sees the underbelly of the spider, while the second player sees a front of the spider since the second player is positioned across from the spider.

In a further embodiment, virtual objects can be stacked on top of one another. For instance, a virtual book shelf or other furniture can be built for placement in a real world room to provide a simulated view, such as for a potential remodel. A user can then place virtual books on the shelf and see how the furniture would look in in the room from all angles by walking around the virtual piece of furniture.

In yet a further embodiment, perspective adjusted virtual views can be used to simulate trying on clothes. A user may want to see whether she would look good in a maxi dress and select to try on a virtual maxi dress. The user can then turn around in front of the camera on her mobile device to see different angles and sides of the virtual dress on.

Other examples for perspective adjusted virtual views, include interior design, such as placing virtual pillows on a virtual couch, putting a virtual puzzle together, and collecting virtual objects. Once collected, a user can manipulate the object in space, such as by moving the virtual object, adding to the virtual object, or altering the object.

Facial recognition can be used with the perspective adjusted virtual views to identify players, set preferences, and customize experiences, such as by displaying virtual objects that an identified player likes.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for rendering perspective adjusted views of a virtual object in a real world environment, comprising:
   a database of virtual objects; and
   a server comprising a central processing unit, memory, an input port to receive at least one of the virtual objects from the database, and an output port, wherein the central processing unit is configured to:
     generate for a mobile device a registration code that changes based on at least one of time and a location of the device;
     receive from another device a representation of the registration code, wherein the other device captures the representation of the registration code from the device;
     determine a distance and orientation of the other device from the device based at least in part on the registration code representation;
     synch positions of the device and the other device based on the distance and orientation; and
     adjust views of a virtual object for the device and other device based on the synched positions of the devices.

2. A system according to claim 1, wherein the registration code is rendered on a display of the device and the other device scans the displayed registration code.

3. A system according to claim 1, wherein the central processing unit receives instructions from at least one of the device and the other device to perform an action with respect to the virtual object.

4. A system according to claim 1, wherein the central processing unit changes the views of the virtual object upon movement of at least one of the device and the other device.

5. A system according to claim 1, wherein the central processing unit identifies a user of the device or the other device and provides a picture of the identified user on the other device or the device.

6. A system according to claim 1, wherein the central processing unit receives information from the other device with the representation of the registration code comprising one or more of identification, location, and orientation of the other device.

7. A system according to claim 1, wherein the registration code includes multiple black modules against a white background, wherein the black modules are determined based on an orientation or location of the device.

8. A system according to claim 7, wherein at least a portion of the black modules of the registration code dynamically changes based on movement of the device.

9. A system according to claim 1, wherein the mobile computing device comprises at least one of a mobile telephone, smart watch, and tablet.

10. A system according to claim 1, wherein the central processing unit calculates a size of the registration code representation and determines the distance of the other device from the device based on the size of the registration code representation.

11. A computer-implemented method for rendering perspective adjusted views of a virtual object in a real world environment, comprising:
    maintaining a database of virtual objects;
    generating for a mobile device a registration code that changes based on at least one of time and a location of the device;
    receiving from another device a representation of the registration code, wherein the other device captures the representation of the registration code from the device;
    determining a distance and orientation of the other device from the device based at least in part on the registration code representation;
    synching positions of the device and the other device based on the distance and orientation; and
    adjusting views of a virtual object for the device and other device based on the synched positions of the devices.

12. A method according to claim 11, wherein the registration code is rendered on a display of the device and the other device scans the displayed registration code.

13. A method according to claim 11, further comprising:
    receiving instructions from at least one of the device and the other device to perform an action with respect to the virtual object.

14. A method according to claim 11, further comprising:
    changing the views of the virtual object upon movement of at least one of the device and the other device.

15. A method according to claim 11, further comprising one of:
    identifying a user of the device or the other device; and
    displaying a picture of the identified user on the other device or the device.

16. A method according to claim 11, further comprising:
    receiving information from the other device with the representation of the registration code comprising one or more of identification, location, and orientation of the other device.

17. A method according to claim 11, wherein the registration code includes multiple black modules against a white background, wherein the black modules are determined based on an orientation or location of the device.

18. A method according to claim 17, wherein at least a portion of the black modules of the registration code dynamically changes based on movement of the device.

19. A method according to claim 11, wherein the mobile computing device comprises at least one of a mobile telephone, smart watch, and tablet.

20. A method according to claim 11, further comprising:
- calculating a size of the registration code representation; and
- determining the distance of the other device from the device based on the size of the registration code representation.

* * * * *